United States Patent
Fu et al.

(10) Patent No.: US 12,147,766 B2
(45) Date of Patent: Nov. 19, 2024

(54) GENERATING DOMAIN SPECIFIC LANGUAGE EXPRESSIONS BASED ON IMAGES

(71) Applicant: Deere & Company, Moline, IL (US)

(72) Inventors: Shuhao Fu, San Jose, CA (US); Alexander Ngai, Irvine, CA (US); Yueqi Li, San Jose, CA (US)

(73) Assignee: Deere & Company, Moline, IL (US)

( * ) Notice: Subject to any disclaimer, the term of this patent is extended or adjusted under 35 U.S.C. 154(b) by 174 days.

(21) Appl. No.: 17/969,425

(22) Filed: Oct. 19, 2022

(65) Prior Publication Data
US 2024/0134936 A1 Apr. 25, 2024
US 2024/0232532 A9 Jul. 11, 2024

(51) Int. Cl.
*G06F 40/284* (2020.01)
*G06F 40/40* (2020.01)
(Continued)

(52) U.S. Cl.
CPC ............ *G06F 40/284* (2020.01); *G06F 40/40* (2020.01); *G06T 7/11* (2017.01); *G06T 15/00* (2013.01);
(Continued)

(58) Field of Classification Search
CPC .......... G06F 40/284; G06F 40/40; G06T 7/11; G06T 15/00; G06T 17/00;
(Continued)

(56) References Cited

U.S. PATENT DOCUMENTS

2017/0206415 A1 7/2017 Redden
2019/0147582 A1 5/2019 Lee et al.
(Continued)

OTHER PUBLICATIONS

Turgut, Kaya, et al. "Segmentation of structural parts of rosebush plants with 3D point-based deep learning methods." Plant Methods 18.1 (Feb. 2022): 20. (Year: 2022).*
(Continued)

*Primary Examiner* — Daniel F Hajnik
(74) *Attorney, Agent, or Firm* — Hanley, Flight & Zimmerman, LLC

(57) ABSTRACT

Implementations are described herein for learning mappings between a domain specific language (DSL) and images, and leveraging those mappings for various purposes. In various implementations, a method for using a DSL to generate training data may include processing data indicative of ground truth image(s) depicting a real plant using a trained image-to-DSL machine learning (ML) model to generate a first expression in the DSL that describes structure of the real plant. The first expression may include a plurality of parameters, and may be processed to programmatically generate a plurality of synthetic DSL expressions. Each respective synthetic DSL expression may describe structure of a respective synthetic plant for which parameter(s) have been altered from the first expression. The synthetic DSL expressions may be processed using a renderer to create three-dimensional (3D) synthetic plant models. Two-dimensional (2D) synthetic images may be generated that depict the 3D synthetic plant models in an area.

20 Claims, 6 Drawing Sheets

(51) Int. Cl.
    *G06T 7/11*     (2017.01)
    *G06T 15/00*     (2011.01)
    *G06T 17/00*     (2006.01)

(52) U.S. Cl.
    CPC .... *G06T 17/00* (2013.01); *G06T 2207/20021* (2013.01); *G06T 2207/20081* (2013.01); *G06T 2207/20084* (2013.01)

(58) Field of Classification Search
    CPC . G06T 2207/20021; G06T 2207/20081; G06T 2207/20084; G06V 20/188; G06V 10/7747
    See application file for complete search history.

(56) References Cited

U.S. PATENT DOCUMENTS

| | | | | |
|---|---|---|---|---|
| 2022/0358265 | A1* | 11/2022 | Wang | G06F 30/27 |
| 2022/0383042 | A1* | 12/2022 | Wang | G06V 20/188 |
| 2023/0133026 | A1* | 5/2023 | Wang | H04N 13/296 |
| | | | | 345/419 |

OTHER PUBLICATIONS

Kola, Ramya Sree. "Generation of synthetic plant images using deep learning architecture." (Jun. 2019). Thesis: Master of Science in Computer Science Engineering, Blekinge Institute of Technology. (Year: 2019).*

Muller et al., "Instant Neural Graphics Primitives with a Multiresolution Hash Encoding" ACM Trans. Graph. 41.4, Article 102. 15 pages, dated Jul. 2022.

Ma et al., "RISP: Rendering-Invariant State Predictor with Differentiable Simulation and Rendering for Cross-Domain Parameter Estimation" ICLR. 18 pages, dated 2022.

Nash et al., "PolyGen: An Autoregressive Generative Model of 3D Meshes" arXiv:2002.10880v1 [cs.GR] dated Feb. 23, 2020.

Sumit Saha "A Comprehensive Guide to Convolutional Neural Networks-the ELI5 way" Towards Data Science. 13 pages, dated Dec. 15, 2018.

Dosovitskiy et al., "An Image is Worth 16×16 Words: Transformers for Image Recognition at Scale" arXiv:2010.11929v2 [cs.CV] dated Jun. 3, 2021.

Vaswani et al., "Attention is All You Need" arXiv:1706.03762v5 [cs.CL] dated Dec. 6, 2017.

Slawomir Halat, "Point Cloud vs 3D Reality Mesh" Virtuosity. 8 pages, dated 2022.

Tancik et al., "Block-NeRF: Scalable Large Scene Neural View Synthesis" arXiv:2202.05263v1 [cs.CV] 15 pages, dated Feb. 10, 2022.

Zhu et al., "Unpaired Image-to-Image Translation using Cycle-Consistent Adversarial Networks" arXiv:1703.10593v7 [cs.CV[ 18 pages, dated Aug. 24, 2020.

"L-system" Wikipedia. 15 pages.

Guenard et al., "Realistic Plant Modeling from Images Based on Analysis-by-Synthesis" Lecture Notes in Computer Science, vol. 8177, 9 pages, dated 2013.

Boudon et al., "L-Py: An L-System Simulation Framework for Modeling Plant Architecture Development Based on a Dynamic Language" Frontiers in Plant Science. 40 pages, dated May 30, 2012.

Cicco et al., "Automatic Model Based Dataset Generation for Fast and Accurate Crop and Weeds Detection" arXiv:1612.03019v3 [cs.CV] 8 pages, dated Aug. 6, 2017.

* cited by examiner

500

PROCESS DATA INDICATIVE OF GROUND TRUTH IMAGE(S) DEPICTING REAL PLANT USING TRAINED IMAGE-TO-DSL ML MODEL TO GENERATE 1ST PARAMETERIZED DSL EXPRESSION THAT DESCRIBES STRUCTURE OF REAL PLANT
502

PROCESS 1ST EXPRESSION TO PROGRAMMATICALLY GENERATE A PLURALITY OF SYNTHETIC DSL EXPRESSIONS, WHEREIN EACH RESPECTIVE SYNTHETIC DSL EXPRESSION DESCRIBES STRUCTURE OF RESPECTIVE SYNTHETIC PLANT FOR WHICH PARAMETER(S) HAVE BEEN ALTERED FROM 1ST EXPRESSION
504

PROCESS SYNTHETIC DSL EXPRESSIONS USING RENDERER TO CREATE 3D SYNTHETIC PLANT MODELS
506

GENERATE 2D SYNTHETIC IMAGE(S) THAT DEPICT THE 3D SYNTHETIC PLANT MODELS
508

PROCESS 2D SYNTHETIC IMAGES USING A TRAINED GENERATOR MODEL TO GENERATE QUASI-REALISTIC SYNTHETIC 2D TRAINING IMAGES
510

USE QUASI-REALISTIC SYNTHETIC 2D TRAINING IMAGES TO TRAIN A MACHINE LEARNING MODEL TO DETECT TARGETED PLANT TRAIT
512

Fig. 5

GENERATING DOMAIN SPECIFIC LANGUAGE EXPRESSIONS BASED ON IMAGES

BACKGROUND

Identification of plant traits in digital imagery has numerous applications. One example application is detection, classification, and/or segmentation of unwanted and/or invasive plants, such as weeds. Another example application is detection, classification, and/or segmentation of plant disease. Yet another example application is detection, classification, and/or segmentation of other types of plant traits, such as plant genus or species (either of which may fall under the definition of plant "type"), phenotypic traits (e.g., gender, strain), and so forth. Various types of machine learning models can be trained to segment and/or recognize various types of plant traits in digital images. Convolutional neural networks are one popular example. However, the accuracy of these machine learning models depends largely on the amount of training data used to train them. Manually annotating training images on a pixel-wise basis and/or using bounding shapes can be prohibitively costly. Moreover, images of plants having some traits may not be as widely available or easily acquired as images of plants having other traits.

SUMMARY

One way to generate synthetic training images, e.g., for training phenotyping machine learning models, is to use a domain specific language (DSL) such as a Lindenmayer system (L-system) framework to write DSL expressions to describe parameterized three-dimensional (3D) plant models. These parameterized 3D plant models can then be portrayed (e.g., projected into) two-dimensional (2D) images that can be used to train downstream machine learning model(s). However, writing DSL expressions suffers from various shortcomings. DSLs such as L-systems may be difficult to learn, and even those with expertise in a given DSL may have trouble writing DSL expressions that describe highly complex structures, such as many types of plants.

Accordingly, implementations are described herein for learning mappings between DSL(s) and images, and leveraging those mappings for various purposes, such as automatically generating synthetic training images that are usable as training data for training machine learning models to detect, segment, and/or classify various types of plant traits (or visual phenomena in other domains) in digital images. More particularly, but not exclusively, implementations are described herein for training and applying an image-to-DL machine learning (ML) model to translate ground truth images into parameterizable expressions in a DSL, such as L-systems. Those parameterizable expressions can be used for a variety of downstream purposes, such as automatically generating large volumes of synthetic training images. As one example, the parameterizable expressions can be used to render large numbers of synthetic plants that have structures comporting with real world plant structure distribution(s) that are observed in ground truth images of real plants.

In some implementations, a method implemented using one or more processors may include: processing data indicative of one or more ground truth images depicting a real plant using a trained image-to-DSL machine learning (ML) model to generate a first expression in the DSL that describes structure of the real plant, wherein the first expression includes a plurality of parameters; processing the first expression to programmatically generate a plurality of synthetic DSL expressions, wherein each respective synthetic DSL expression describes structure of a respective synthetic plant for which one or more of the parameters has been altered from the first expression; processing the plurality of synthetic DSL expressions using a renderer to create a plurality of three-dimensional (3D) synthetic plant models; and generating one or more two-dimensional (2D) synthetic images that depict the plurality of 3D synthetic plant models in an area.

In various implementations, the method may include using the one or more 2D synthetic images as training data to train another machine learning model to segment or detect, in digital images, plants of a same type as at least some of the 3D synthetic plant models. In various implementations, the DSL may be an L-system framework.

In various implementations, the trained image-to-DSL ML model may be an attention-based transformer. In various implementations, processing the one or more images may include dividing one or more of the images into a plurality of image patches, and iteratively processing the plurality of image patches using the attention-based transformer to generate a respective plurality of output tokens in the DSL.

In various implementations, the method may include processing the one or more ground truth images using a real-to-sim generator of a generative adversarial network (GAN) to generate one or more synthetic translations of the one or more ground truth images in a synthetic domain, wherein the data indicative of the ground truth images comprises the one or more synthetic translations of the one or more ground truth images in the synthetic domain.

In various implementations, the trained image-to-DSL ML model may be trained using the following operations: processing a first set of expressions in the DSL using the renderer to create a plurality of initial training 3D synthetic plant models; generating a plurality of initial training synthetic 2D images that depict the plurality of initial training 3D synthetic plant models; processing the plurality of initial training synthetic 2D training images using the image-to-DSL ML model to predict a second set of expressions in the DSL; comparing expressions in the DSL across the first and second sets of expressions; and training the image-to-DSL ML model based on the comparing. In various implementations, the image-to-DSL ML model may be further trained by programmatically generating the plurality of different training expressions in the DSL. In various implementations, at least some of the plurality of different synthetic training expressions in the DSL may be generated stochastically.

In addition, some implementations include one or more processors (e.g., central processing unit(s) (CPU(s)), graphics processing unit(s) (GPU(s)), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 5 is a flowchart of an example method in accordance with various implementations described herein.

DETAILED DESCRIPTION

Figure 1:
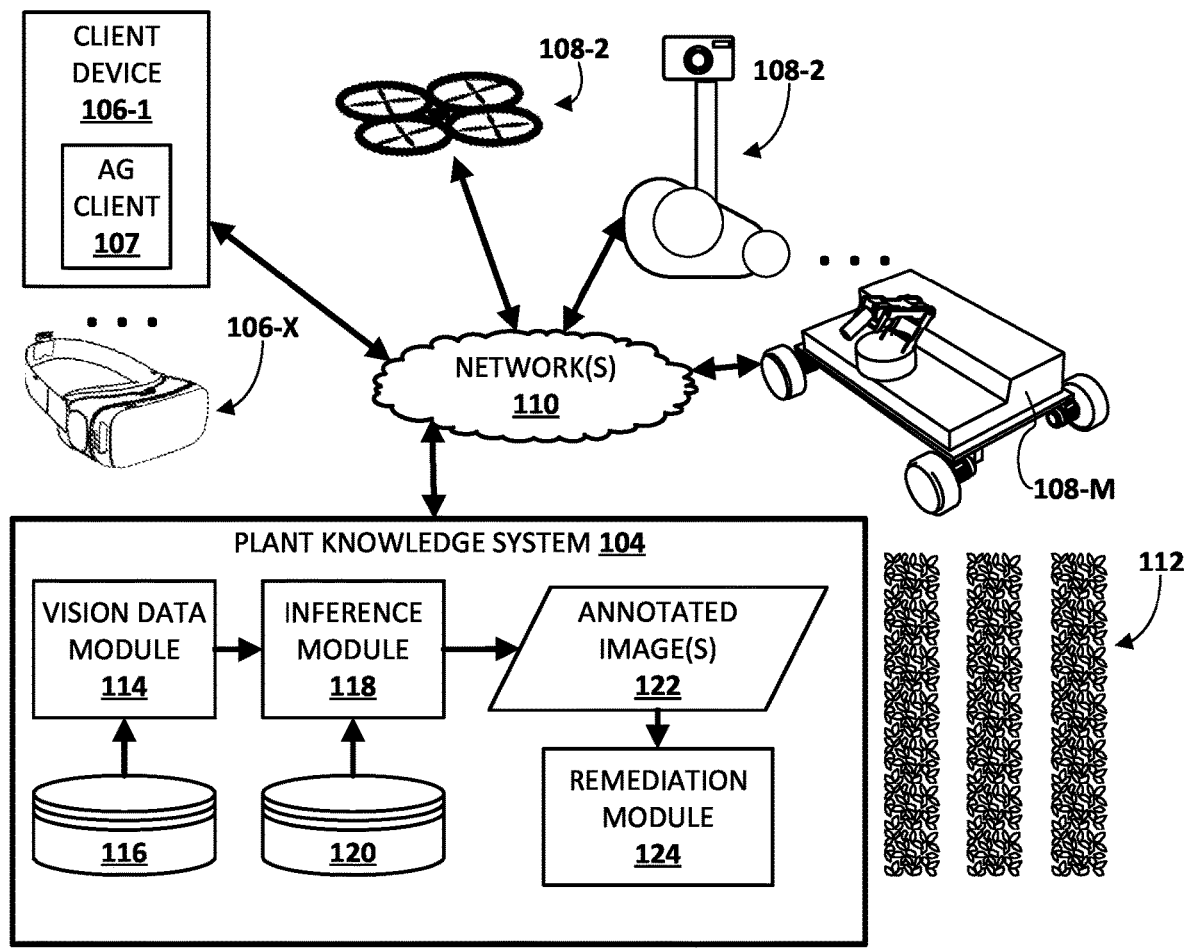
FIG. 1 schematically depicts an example environment in which selected aspects of the present disclosure may be employed in accordance with various implementations.

Implementations are described herein for learning mappings between DSL(s) and images, and leveraging those mappings for various purposes, such as automatically generating synthetic training images that are usable as training data for training machine learning models to detect, segment, and/or classify various types of plant traits (or visual phenomena in other domains) in digital images. More particularly, but not exclusively, implementations are described herein for training and applying an image-to-DL machine learning (ML) model to translate ground truth images into parameterizable expressions in a DSL, such as L-systems. Those parameterizable expressions can be used for a variety of downstream purposes, such as automatically generating large volumes of synthetic training images. As one example, the parameterizable expressions can be used to render large numbers of synthetic plants that have structures comporting with real world plant structure distribution(s) that are observed in ground truth images of real plants.

Annotation of synthetic training images generated using techniques described herein can be performed automatically as part of the generation process, at a per-pixel level or using bounding shapes, significantly reducing or eliminating the costs associated with creating annotated training data from real-life digital images. These synthetic training images may then be used for various purposes. In some implementations, the synthetic training images may be used to train other machine learning models, such as convolutional neural networks (CNNs), to detect various objects and/or visual phenomena, such as traits of plants (e.g., plant type, plant gender, plant disease, plant strain, plant health, plant malady, etc.).

In various implementations, an image-to-DSL machine learning (ML) model such as an auto-encoder and/or attention-based transformer model (e.g., Bidirectional Encoder Representations from Transformers, or "BERT") may be trained to translate images depicting plants to expressions in a DSL that describe the structure and/or geometry of those plants, such as counts and/or locations of various plant parts (e.g., branches, leaves, fruit, stems, etc.). In various implementations, the DSL may be parameterizable, which means its syntax may include individual parameters and/or values that can be adjusted to alter an underlying plant's structure/geometry. In some implementations, the DSL may be an L-system framework.

Manually labeling ground truth images of plants with corresponding DSL expressions for purposes of training the image-to-DSL ML model may be prohibitively costly in terms of computing resources, time, etc. However, it may be considerably less costly to programmatically (e.g., automatically, with little or no human intervention) generate large numbers of disparate DSL expressions describing structures of hypothetical plants. As an example, for relatively little cost, parameters of a small number of "seed" DSL expressions may be adjusted stochastically and/or heuristically to generate large numbers of synthetic DSL expressions.

Accordingly, in various implementations, large numbers of synthetic DSL expressions can be generated programmatically. These synthetic DSL expressions can then be processed using a renderer (e.g., a software process) that is designed to create three-dimensional (3D) synthetic plant models based on structures/geometries conveyed in the DSL expressions. Two-dimensional (2D) synthetic training images that depict the plurality of 3D synthetic plant models may then be generated, e.g., by projecting the 3D synthetic plant models onto two-dimensional images. These 2D synthetic training images can be processed using the image-to-DSL ML model to generate corresponding predicted DSL expressions. The predicted DSL expressions may be compared to the original synthetic DSL expressions to determine errors. Based on these errors, the image-to-DSL ML model may be trained, e.g., using techniques such as stochastic gradient descent and/or back propagation.

Once the image-to-DSL ML model is trained, it may be used to translate (e.g., in bulk) ground truth images depicting real plants to ground truth DSL expressions that describe structures/geometries of those real plants. These ground truth DSL expressions can then be used for various purposes. In some implementations, they may be used as additional "seed" expressions that can then be programmatically varied to generate any number of synthetic DSL expressions. These downstream synthetic DSL expressions may accurately reflect and/or comport with distribution(s) of plant structures/geometries observed in the ground truth images depicting the real plants.

The downstream synthetic DSL expressions may then be processed using the renderer to generate additional 3D synthetic plant models that can be used to generate additional 2D synthetic training images, like described previously. Because these additional 2D synthetic training images were generated based on 3D synthetic plant models having known parameters, those known parameters can be used as (or to determine) labels/annotations for those 2D synthetic training images, e.g., to train downstream machine learning models to predict similar labels/annotations in other images.

As noted previously, in some implementations, the image-to-DSL ML model may be implemented as an attention-based transformer. Many attention-based transformers are sequence-to-sequence models. Accordingly, in some implementations, images that are processed using the image-to-DSL ML model may be preprocessed to generate a sequence of image patches. Each image patch may correspond to a portion of the original image. The sequence of image patches may then be processed using the image-to-DSL ML model to generate a sequence of tokens in the DSL.

Implementing the image-to-DSL ML model as a transformer may give rise to various technical benefits. When used as described herein, attention-based transformers may generate better results than other types of ML models more typically associated with image processing, such as CNNs. CNNs may assume interaction primarily between pixels and/or visual features that are in relatively close proximity. This assumption may not be true for 3D modeling of plants, however, because plants are interconnected and interdependent systems: each plant part (or trait) likely impacts and/or influences any or all other parts (or traits) of the same plant, regardless of those parts' proximities. Using attention-based transformers avoids the need for explicitly defining (e.g., hard-coding) relationships between a sequence of inputs (e.g., the image patches mentioned previously) and a sequence of outputs (e.g., DSL tokens). With attention-based transformers, all pairing possibilities can be considered, and the transformer can learn to adapt to new domains (e.g., heretofore unseen plants).

FIG. 1 schematically illustrates an environment in which one or more selected aspects of the present disclosure may be implemented, in accordance with various implementations. The example environment includes one or more agricultural areas 112 and various equipment that may be deployed at or near those areas, as well as other components that may be implemented elsewhere, in order to practice selected aspects of the present disclosure. Various components in the environment are in communication with each other over one or more networks 110. Network(s) 110 may take various forms, such as one or more local or wide area networks (e.g., the Internet), one or more personal area networks ("PANs"), one or more mesh networks (e.g., ZigBee, Z-Wave), etc.

Agricultural area(s) 112 may be used to grow various types of crops that may produce plant parts of economic and/or nutritional interest. Agricultural area(s) 112 may include, for instance, one or more crop fields, one or more plots, one or more gardens, one or more greenhouses, or any other areas in which there may be an interest or desire to automatically detect, classify, and/or segment plants having particular targeted traits. Plant traits may take various forms, including but not limited to plant types (e.g., genus, species, variety, etc.), plant gender, various observable characteristics of a plant resulting from an interaction of the plant's genotype with its environment ("phenotype"), plant disease, stage of growth, presence/absence of some targeted gene/ gene sequence, etc. As one non-limiting example, there may be considerable interest and/or benefit in automatically detecting plants having a trait of being "undesirable" (sometimes such plants are referred to as "weeds") in an area 112 in which other desired plants are being grown. Once detected, various remedial actions may be taken, such as flagging the weeds' locations for removal or treatment (e.g., herbicide application) by agricultural personnel and/or farming equipment.

An individual (which in the current context may also be referred to as a "user") may operate one or more client devices 106-1 to 106-X to interact with other components depicted in FIG. 1. A client device 106 may be, for example, a desktop computing device, a laptop computing device, a tablet computing device, a mobile phone computing device, a computing device of a vehicle of the participant (e.g., an in-vehicle communications system, an in-vehicle entertainment system, an in-vehicle navigation system), a standalone interactive speaker (with or without a display), or a wearable apparatus that includes a computing device, such as a head-mounted display ("HMD") 106-X that provides an AR or VR immersive computing experience (e.g., the ability to navigate and/or interact in one or more "metaverses"), a "smart" watch, and so forth. Additional and/or alternative client devices may be provided.

Plant knowledge system 104 is an example of an information system in which the techniques described herein may be implemented. Each of client devices 106 and plant knowledge system 104 may include one or more memories for storage of data and software applications, one or more processors for accessing data and executing applications, and other components that facilitate communication over a network. The operations performed by client device 106 and/or plant knowledge system 104 may be distributed across multiple computer systems.

Each client device 106 may operate a variety of different applications that may be used to perform various agricultural tasks, such as crop yield prediction and diagnosis. For example, a first client device 106-1 operates agricultural ("AG") client 107 (e.g., which may be standalone or part of another application, such as part of a web browser). Another client device 106-X may take the form of an HMD that is configured to render 2D and/or 3D data to a wearer as part of a VR immersive computing experience, e.g., in which the user can interact with one or more metaverses. For example, the wearer of client device 106-X may be presented with 3D point clouds and/or 3D models generated as described herein that represent various aspects of objects of interest, such as fruits of crops, weeds, crop yield predictions, etc. The wearer may interact with the presented data, e.g., using HMD input techniques such as gaze directions, blinks, etc.

In some implementations, AG client 107 may be used to communicate to agricultural personnel instructions and/or information that can help them perform various agricultural tasks. For example, a remediation module 124 (described in more detail below) may generate a report, a map, instructions, and/or any other data that may be presented to an operator of a client device using a graphical user interface, audibly, etc. These data may inform the agricultural personnel where plants having targeted traits (e.g., weeds, diseased plants, plants have desired characteristics, etc.) are located, what action(s) should be taken on those plants, a timeframe in which those action(s) should be taken, etc.

In some implementations, one or more robots 108-1 to 108-M may be deployed to perform various agricultural tasks. Performance of some of these tasks—including but not limited to weed remediation, plant harvesting, etc.—may be performed using machine learning model(s) trained on synthetic training data created using techniques described herein. An individual robot 108-1 to 108-M may take various forms, such as an unmanned aerial vehicle 108-1, a robot (not depicted) that is propelled along a wire, track, rail or other similar component that passes over and/or between crops, wheeled robots 108-2 to 108-M (e.g., rovers), or any other form of robot capable of being propelled or propelling itself past crops of interest.

In some implementations, different robots may have different roles, e.g., depending on their capabilities. For example, in some implementations, one or more of robots 108-1 to 108-M may be designed to capture data, others may be designed to manipulate plants or perform physical agricultural tasks, and/or others may do both. Robots 108 may include various types of sensors, such as vision sensors (e.g., 2D digital cameras, 3D cameras, 2.5D cameras, infrared cameras, etc.), inertial measurement unit ("IMU") sensors, Global Positioning System ("GPS") sensors, X-ray sensors, moisture sensors, lasers, barometers (for local weather information), photodiodes (e.g., for sunlight), thermometers, etc.

In various implementations, plant knowledge system 104 may be implemented across one or more computing systems that may be referred to as the "cloud." Plant knowledge system 104 may receive vision data generated by robots 108-1 to 108-M (and/or robots at other agricultural sites) and process it using various image processing techniques to perform tasks such as detection, classification, and/or segmentation of plants having targeted traits. In various implementations, plant knowledge system 104 may include a vision data module 114 and an inference module 118. In some implementations one or more of modules 114 and 118 may be omitted, combined, and/or implemented in a component that is separate from plant knowledge system 104.

Plant knowledge system 104 may also include one or more databases. For example, plant knowledge system 104 may include, in communication with vision data module 114, an imagery database 116 for storing image data captured by, for instance, agricultural personnel and/or one or more robots 108-1 to 108-M. Plant knowledge system 104 may also include a machine learning model database 120 that includes one or more machine learning models that are used to generate and/or are trained based on synthetic training data created using techniques described herein. In this specification, the term "database" and "index" will be used broadly to refer to any collection of data. The data of the database and/or the index does not need to be structured in any particular way and it can be stored on storage devices in one or more geographic locations.

Vision data module 114 may be configured to obtain digital images and/or other imagery data from various sources, such as imagery database 116 purposed as an imagery clearinghouse, as well as from sources such as robots 108-1 to 108-M. Vision data module 114 may then provide these imagery data to inference module 118. In other implementations, vision data module 114 may be omitted and the functions described herein as being performed by vision data module 114 may be performed by other components of plant knowledge system 104, such as inference module 118.

Inference module 118 may be configured to apply imagery data received from vision data module 114 as input across various machine learning models stored in machine learning model database 120 to generate output. This output may be indicative of plants having targeted traits that are detected, segmented, and/or classified in imagery data received from vision data module 114. To this end, machine learning models stored in database 120 may be trained to detect, classify, and/or segment plants depicting having targeted traits in 2D digital images of agricultural area(s) 112 captured by agricultural personnel and/or by robot(s) 108. Additionally, inference module 118 may apply the image-to-DSL ML model to images to generate DSL expressions.

Various types of machine learning models may be trained, e.g., using synthetic training data generated using techniques described herein, to detect, classify, and/or segment plants having targeted traits in imagery data. In some implementations, a CNN may be trained to generate output indicative of the presence and/or absence of targeted trait(s) in plants depicted in digital imagery. In FIG. 1, for instance, inference module 118 generates annotated image(s) 122 that include bounding-box and/or pixel-wise annotations identifying one or more plants having targeted traits. Pixel-wise annotations may be used, for instance, to segment the digital image into portions showing plants having targeted traits, such as weeds, diseased plants, plants having some desired characteristic, etc.

In some such implementations, remediation module 124 may be configured to take remedial action using these annotated and/or segmented images 122. For example, in some implementations, remediation module 124 may deploy one or more robots 108 to take remedial action on the plants detected as having the detected traits, such as pulling weeds, spraying plants with chemicals, destroying weeds using other mechanical and/or energy-based means, harvesting desired plant parts (e.g., fruits, flowers, etc.), and so forth. In other implementations, inference module 118 may output one or more probabilities that one or more plants having targeted traits are detected in an image. In some implementations, remediation module 124 may provide output that includes, for instance, a map of plants having a targeted trait, e.g., for remediation or other action by agricultural personnel.

In some implementations, one or more components of plant knowledge system 104 may be implemented in whole or in part on a robot 108. For example, inference module 118 may be implemented in whole or in part on a robot 108 that is also equipped with a vision sensor such as a two-dimensional camera. By having an onboard inference module 118, robot 108 may be able to process its own images to quickly detect plants having targeted traits. Robot 108 may also include its own remediation module 124 that enables robot 108 to take remedial action in real time.

As noted previously, obtaining sufficient ground truth training data to train machine learning model(s) such as CNNs to detect particular plants having various targeted traits may be resource-intensive and/or difficult. While images of plants having some desirable traits (e.g., fruit ready for harvest) may be captured relatively frequently, pictures of plants having less common traits (e.g., weeds, diseased plants, plants incapable of reproducing, etc.) may be less common. Moreover, manually annotating and/or labeling training data for supervised training can be prohibitively costly. Accordingly, techniques are described herein for generating synthetic training data with little or no human intervention that can be used to train machine learning model(s) such as CNNs to detect plants having targeted traits.

Figure 2:
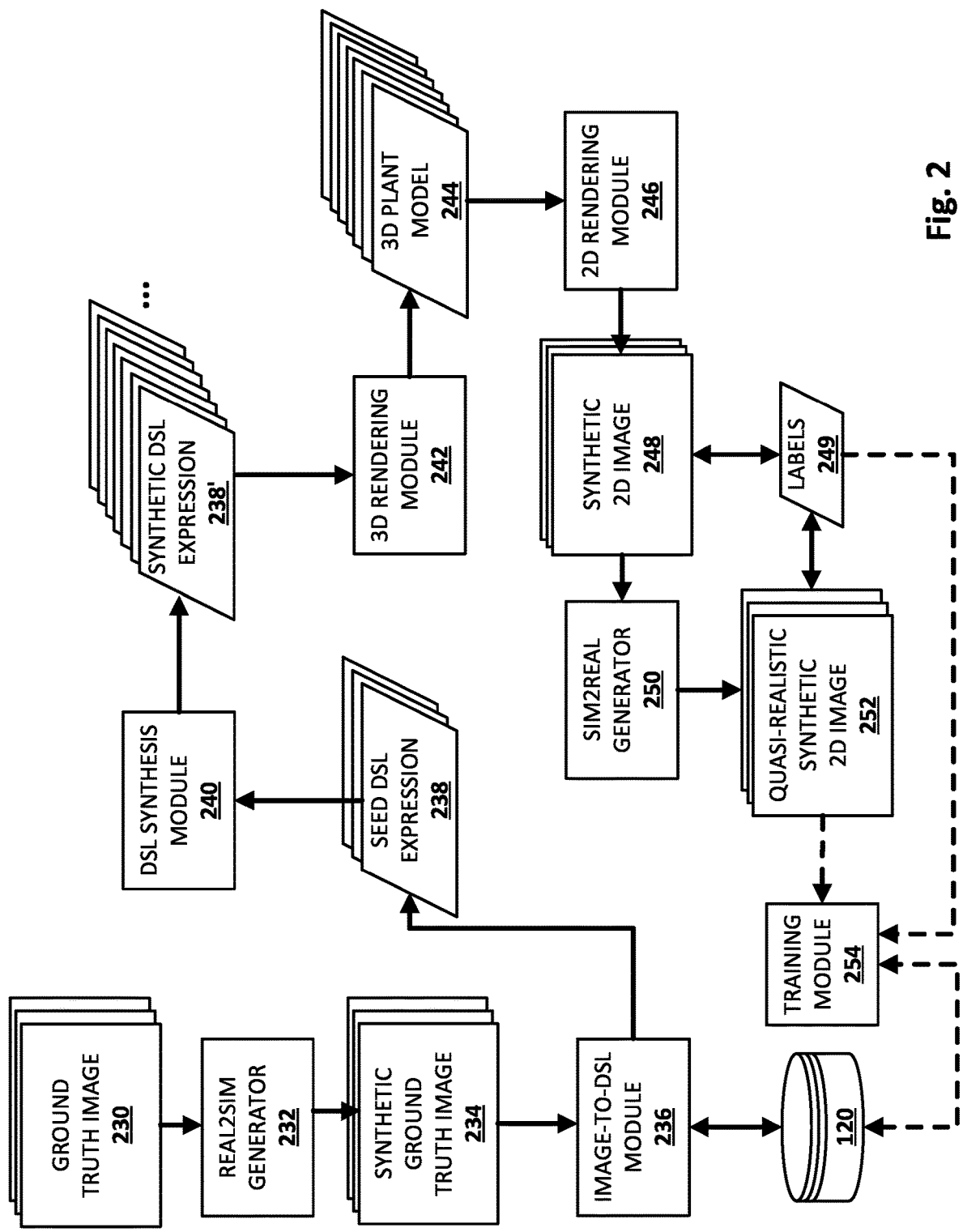
FIG. 2 schematically depicts components and a process for practicing selected aspects of the present disclosure related to using the image-to-DSL ML model to generate training data, in accordance with various implementations.

FIG. 2 schematically depicts an example process pipeline for generating synthetic training data in accordance with various implementations described herein. Various components depicted in FIG. 2 may be implemented using any combination of software and hardware, and in some cases may be implemented as part of plant knowledge system 104. Starting at top left, one or more ground truth digital images 230 depicting plants having targeted trait(s) may be captured and/or retrieved from a database. These images may be captured, for instance, by robots 108-1 to 108-M and/or by agricultural personnel, and/or may be stored in and retrieved from a database such as imagery database 116.

In some implementations, it may be beneficial to bridge the gap between real images and synthetic (or "simulated") images to improve downstream processing. Accordingly, in some implementations, a real2sim generator 232 may be configured to translate ground truth digital image(s) 230 from the real domain into a synthetic domain, e.g., to generate synthetic ground truth image(s) 234. Real2sim generator 232 may, in some cases, utilize a generator machine learning model (not depicted) that is part of a larger generative adversarial network (GAN, also not depicted). In some implementations, the GAN may be a cycleGAN that also includes various discriminators models, as well as another generator model that can be used, e.g., by a sim2real generator 250, to translate synthetic 2D images from the synthetic domain to the real domain.

Synthetic ground truth image(s) 234 may be processed by an image-to-DSL module 236 (which may share various characteristics with inference module 118 in FIG. 1) based on an image-to-DSL ML model stored in database 120. The result may be one or more "seed" DSL expressions, each describing structure/geometry of a respective plant depicted in ground truth image(s) 230. In various implementations, seed DSL expressions 238 (and other DSL expressions depicted in the figures) may be written in parameterizable DSLs, such as L-system expressions. In other implementations, DSL expressions may take other forms, such as various markup languages (e.g., JavaScript Object Notation, or "JSON"). In yet other implementations, forms other than DSL expressions may be employed. For example, in some implementations, crop images may be encoded into continuous vector embeddings that represent, in reduced dimension form, structure and/or relationships of the various parts of crops.

In some implementations, there may be as many seed DSL expression(s) 238 as there are plants depicted in ground truth image(s) 230. In FIG. 2, for instance, there are three seed DSL expressions 238, indicating that there were three individual plants depicted in ground truth image(s) 230. However, this is for illustrative purposes only, and should not be construed as limiting.

A DSL synthesis module 240 may be configured to process seed DSL expressions 238 to programmatically generate a greater number of synthetic DSL expressions 238'. Each respective synthetic DSL expression 238' may describe structure of a respective synthetic plant for which one or more of the parameters has been altered from a seed DSL expression 238. These parameters may be altered/varied in numerous ways, heuristically (e.g., based on various rules) and/or stochastically. In some implementations, parameters may be stochastically altered in accordance with (e.g., weighted by) desired or observed agricultural conditions (or observed distributions thereof), such as climate, soil conditions, agricultural management practices, etc. As shown in FIG. 2, there are far more synthetic DSL expressions 238' than seed DSL expressions 238. This may allow for the automatic and/or programmatic generation of large amounts of synthetic training data.

A 3D rendering module 242 may be a software process that is configured to receive synthetic DSL expressions 238' as input and to generate, as output, 3D plant models 244. 3D plant models 244 may come in various formats. In some implementations, 3D plant models 244 may be used for purposes other than synthetic training data generation. For example, HMD 106-X may render, in three dimensions, a 3D plant model 244. Thus, a user may be able to capture 2D images of plants and render those plants in 3D based on the DSL expressions predicted from the 2D images. This may provide an alternative way of viewing plants in three dimensions to, for instance, using structure from motion (SfM) to take multiple 2D images of the same plant, and then process them to generate a 3D point cloud. Generating 3D models from parameterizable DSL expressions, as opposed to using SfM processing, may also allow for various structural and/or geometric parameters of the plants to be easily altered and/or manipulated. As one example, 3D plants rendered using techniques described herein may be employed in simulations that are used to train robot policies to allow robots to perform tasks such as weed remediation, harvesting, tilling, etc.

Referring back to FIG. 2, a 2D rendering module 246 may incorporate these 3D models 244 into one or more synthetic 2D images 248, e.g., by projecting the 3D models onto a 2D background. In various implementations, this 2D background, which also may be referred to (and function as) as "canvas," may be a ground truth image captured by a digital camera of an area (e.g., a field), or may be a simulated environment. Such a simulated environment may be simulated by a computer, e.g., automatically or with guidance from an author. In other implementations, the 2D background may be drawn or painted. Because 2D rendering module 246 incorporates the 3D plant models 244 at known locations, 2D rendering module 246 is able to generate synthetic 2D images 248 that include labels 249 that convey this information. These labels 249 may take various forms, such as pixel-wise annotations, bounding shapes such as bounding boxes that encompass plants having targeted traits, metadata containing classifications, etc.

In various implementations, the forementioned sim2real generator 250 may be configured to process labeled synthetic 2D images 248, e.g., using a sim2real generator model of the aforementioned GAN, to generate quasi-realistic 2D images 252. These quasi-realistic 2D images 252 may include the same synthetic plants as labeled synthetic 2D images 248. Moreover, the labels 249 of labeled synthetic 2D images 248 may be preserved in (or in association with) into quasi-realistic 2D images 252. Quasi-realistic 2D synthetic image(s) 252 may be more effective and/or efficient training data than synthetic 2D images 248. It should be understood that sim2real translation is not required in all implementations, and sim2real generator 250 may be omitted.

In some implementations, quasi-realistic synthetic images 252 may be used, e.g., by a training module 254, to train one or more downstream machine learning models (e.g., CNNs) to be usable to perform tasks such as detecting plant traits, classifying plants into particular classes (e.g., genus', species), etc. As shown by the dashed arrows in FIG. 2, training module 254 may be configured to apply data indicative of quasi-realistic 2D images 252—e.g., the images themselves or embeddings generated therefrom—as inputs across one or more machine learning models from database 120 mentioned previously. The one or more machine learning models may include, for instance, a CNN that is intended to annotate quasi-realistic 2D images in various ways (e.g., pixel-wise annotations, bounding shapes) to identify plants and/or parts of plants exhibiting targeted trait(s).

The labels predicted based on such a machine learning model may be compared, e.g., by training module 254 as part of supervised training, to the labels 249 associated with quasi-realistic 2D images 252. Any difference(s) or "error" between the annotations and the labels may be used by training module 254 to train the machine learning model, e.g., using techniques such as gradient descent, back propagation, etc. Once trained, the machine learning model can be used by inference module 118 as described previously with FIG. 1. In some implementations, inference module 118 and training module 254 may be combined.

Figure 3:
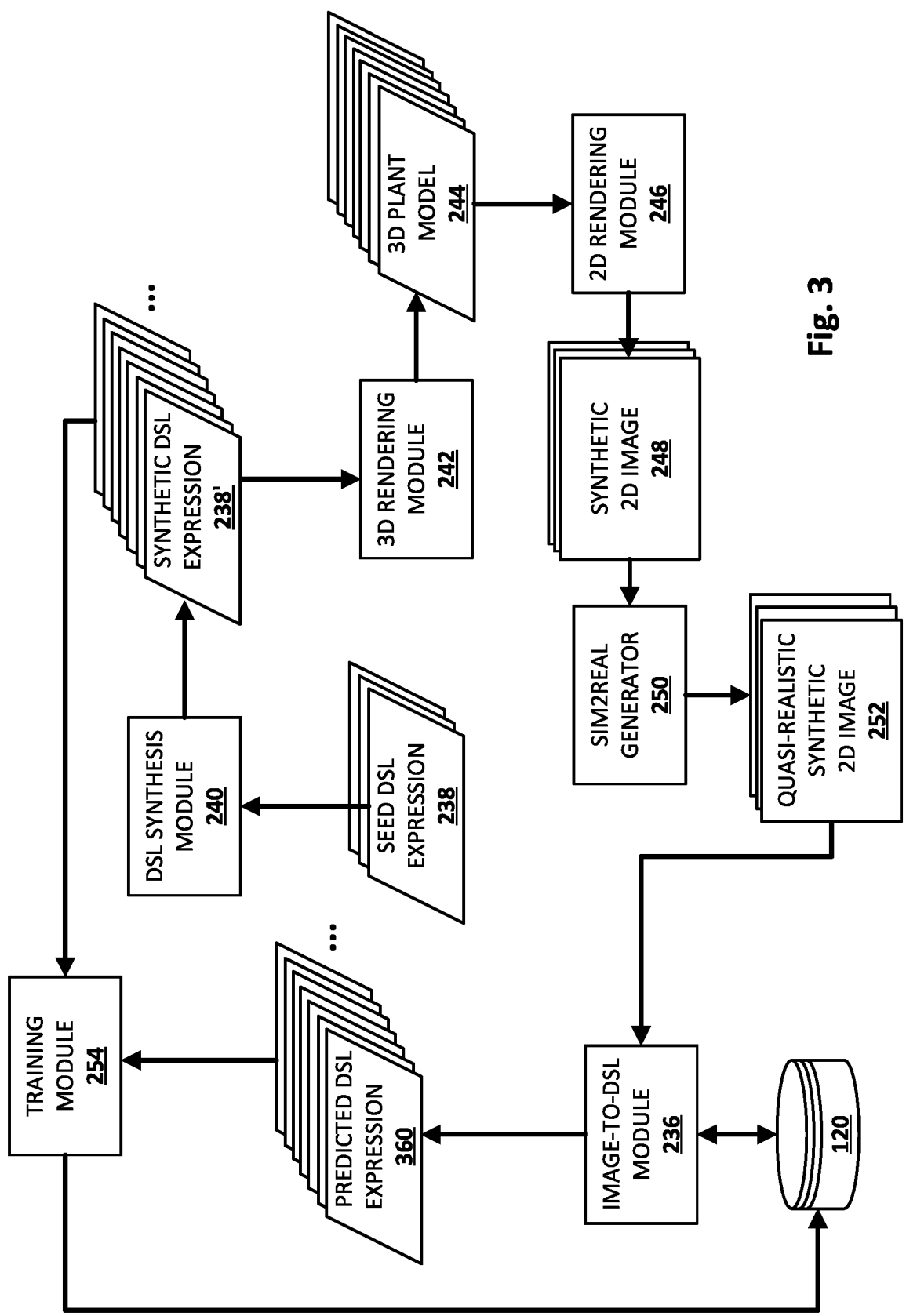
FIG. 3 schematically depicts components and a process for practicing selected aspects of the present disclosure related to training the image-to-DSL ML model, in accordance with various implementations.

FIG. 3 schematically depicts an example of how an image-to-DSL model used by image-to-DSL module 236 may be trained, in accordance with various implementations. Starting in the middle, some number of seed DSL expressions 238 may be provided. In some cases these may be the same seed DSL expressions as were depicted in FIG. 2. In other cases, these may be distinct, and may include DSL expressions that are hand-crafted and/or curated based on observing a relatively small number of plants.

DSL synthesis module 240 may programmatically generate a larger number of synthetic DSL expressions 238', as described previously with respect to FIG. 2. These synthetic DSL expressions 238' may represent variations of the original seed DSL expressions 238 and may be generated programmatically in large numbers. As before, they may be processed by 3D rendering module 242 to generate 3D plant models 244, which in turn are processed by 2D rendering module 246 to generate synthetic 2D images 248. And once again, in some implementations, the synthetic 2D images 248 may be processed by sim2real generator 250 to generate quasi-realistic synthetic 2D images 252 (although this is not required in all cases).

In various implementations, quasi-realistic synthetic 2D images 252 may be processed by image-to-DSL module 236 using the image-to-DSL ML model stored in database 120 to generate a plurality of predicted DSL expressions 360. Training module 254 may then compare the predicted DSL expressions 360 to synthetic DSL expressions 238' that were used as the basis for quasi-realistic synthetic 2D images 252. Based on these comparison(s), training module 254 may train the image-to-DSL ML model stored in database 120, e.g., using techniques such as stochastic gradient descent and/or back propagation.

Figure 4:
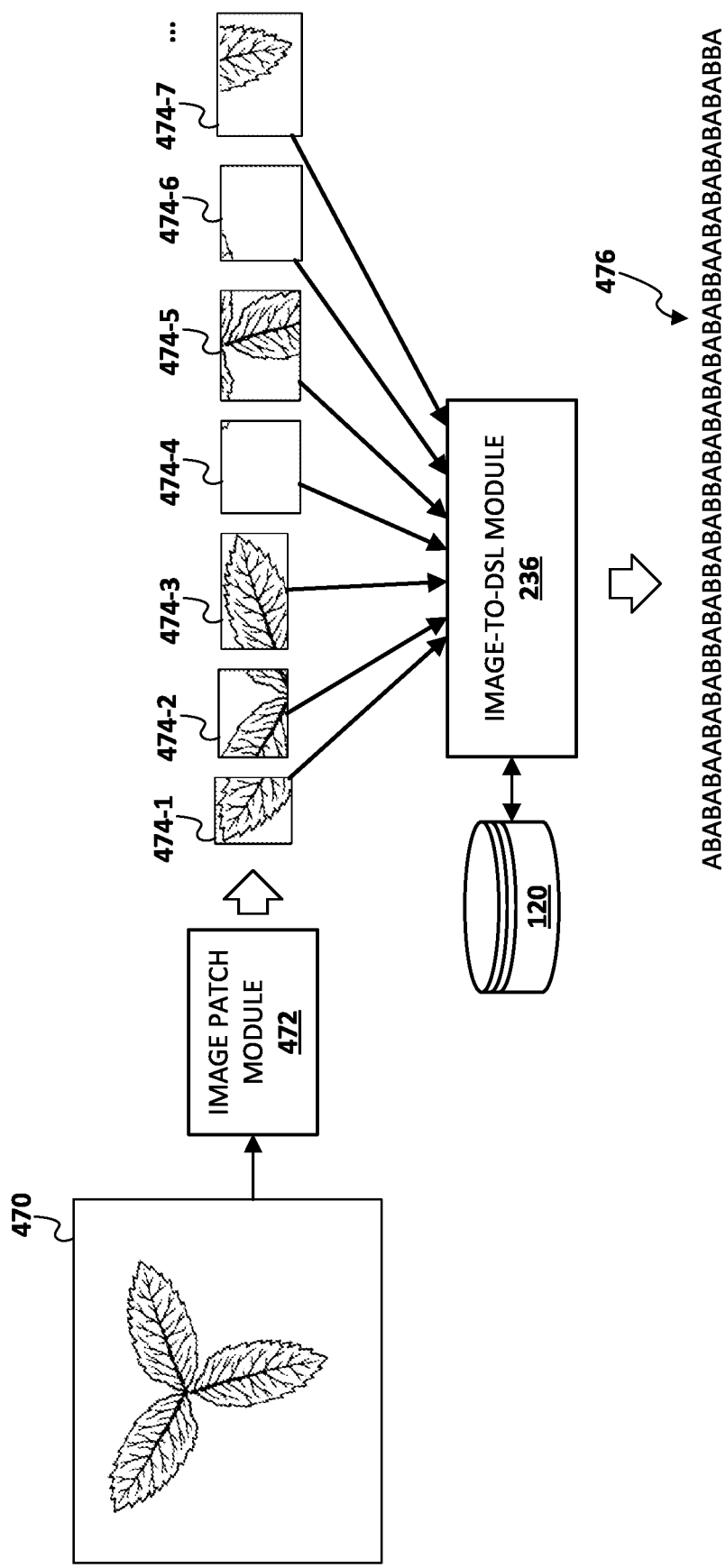
FIG. 4 schematically depicts an example of how an image-to-DSL ML model may operate, in accordance with various implementations.

FIG. 4 schematically depicts one example of how techniques described herein may be implemented to process an image using a trained image-to-DSL model. Starting at left, an input image 470 depicting a plant is provided as input to an image patch module 472. Image patch module 472 may be configured to divide input image 470 into a plurality of image patches 474-1, 474-2, . . . . Plurality of image patches 474-1, 474-2, . . . may correspond to regions of input image 470 that may or may not overlap with each other. While not shown in FIG. 4, in some implementations, input image 470 may be translated into, or have been translated into previously, the synthetic domain from the real domain, e.g., by real2sim generator 232 as described previously.

Image-to-DSL module 236 may be configured to iteratively process plurality of image patches 474-1, 474-2, . . . using the image-to-DSL ML model stored in database 120, which as noted previously may take the form of a sequence-to-sequence, attention-based transformer. This process may generate a respective plurality of output tokens 476 in the DSL (which in this example is L-system). As described previously, these output tokens 476 and the DSL expression they represent may be processed by DSL synthesis module 240 to generate any number of variations of synthetic DSL expressions. Those synthetic DSL expressions may then be used, for instance, to generate additional training data that can be used to train downstream ML models, as depicted in FIG. 2. 3D models generated as part of that process (or independently) may be used for other purposes as well, such as simulating parameterizable plants in 3D.

FIG. 5 illustrates a flowchart of an example method 500 for using a DSL to generate training data as described herein. The operations of FIG. 5 can be performed by one or more processors, such as one or more processors of the various computing devices/systems described herein, such as by plant knowledge system 104. For convenience, operations of method 500 will be described as being performed by a system configured with selected aspects of the present disclosure. Other implementations may include additional operations than those illustrated in FIG. 5, may perform step(s) of FIG. 5 in a different order and/or in parallel, and/or may omit one or more of the operations of FIG. 5.

At block 502, the system, e.g., by way of inference module 118, may process data indicative of one or more ground truth images (e.g., 230, 470) depicting a real plant using a trained image-to-DSL ML model to generate a first expression in the DSL (e.g., 238, 476) that describes structure of the real plant. In implementations in which the DSL is a parameterizable DSL, like L-system, the first expression may include a plurality of parameters that can be adjusted. In some implementations, the ground truth image itself (or embedding(s) generated therefrom) may be processed directly using image-to-DSL ML model. In other implementations, and as shown in FIG. 4, the input image(s) may be divided, e.g., by image patch module 472, into a plurality of image patches (e.g., 474-1, 474-2, . . . ). These image patches (or embeddings generated therefrom) may be iteratively processed using the image-to-DSL ML model to generate a respective plurality of output tokens (e.g., 476) in the DSL.

At block 504, the system, e.g., by way of DSL synthesis module 240, may process the first expression to programmatically generate a plurality of synthetic DSL expressions (e.g., 238'). Each respective synthetic DSL expression 238' may describe structure of a respective synthetic plant for which one or more of the parameters has been altered from the first expression.

At block 506, the system may process the plurality of synthetic DSL expressions (e.g., 238') using a renderer—e.g., 3D rendering module 242—to create a plurality of 3D synthetic plant models. As noted previously, these 3D synthetic plant models may be useful in and of themselves for a variety of different purposes, such as an alternative to 3D point clouds generated from SfM, for robot policy training using simulation, 3D rendering using HMD 106-X, etc.

At block 508, the system, e.g., by way of 2D rendering module 246, may generate one or more 2D synthetic images that depict the plurality of 3D synthetic plant models in an area. Optionally, in some implementations, at block 510, the system, e.g., by way of sim2real generator 250, may process the one or more ground truth images to generate one or more synthetic translations of the one or more ground truth images in a synthetic domain. In various implementations, the data indicative of the ground truth image that is processed using the image-to-DSL ML model at block 502 may include the one or more synthetic translations of the one or more ground truth images in the synthetic domain.

At block 512, the system, e.g., by way of inference module 118 and/or training module 254, may use the one or more 2D synthetic images as training data to train another machine learning model to perform various tasks. These tasks may include, for instance, segmenting or detecting, in digital images, plants of a same type as at least some of the 3D synthetic plant models generated at block 506.

Figure 6:
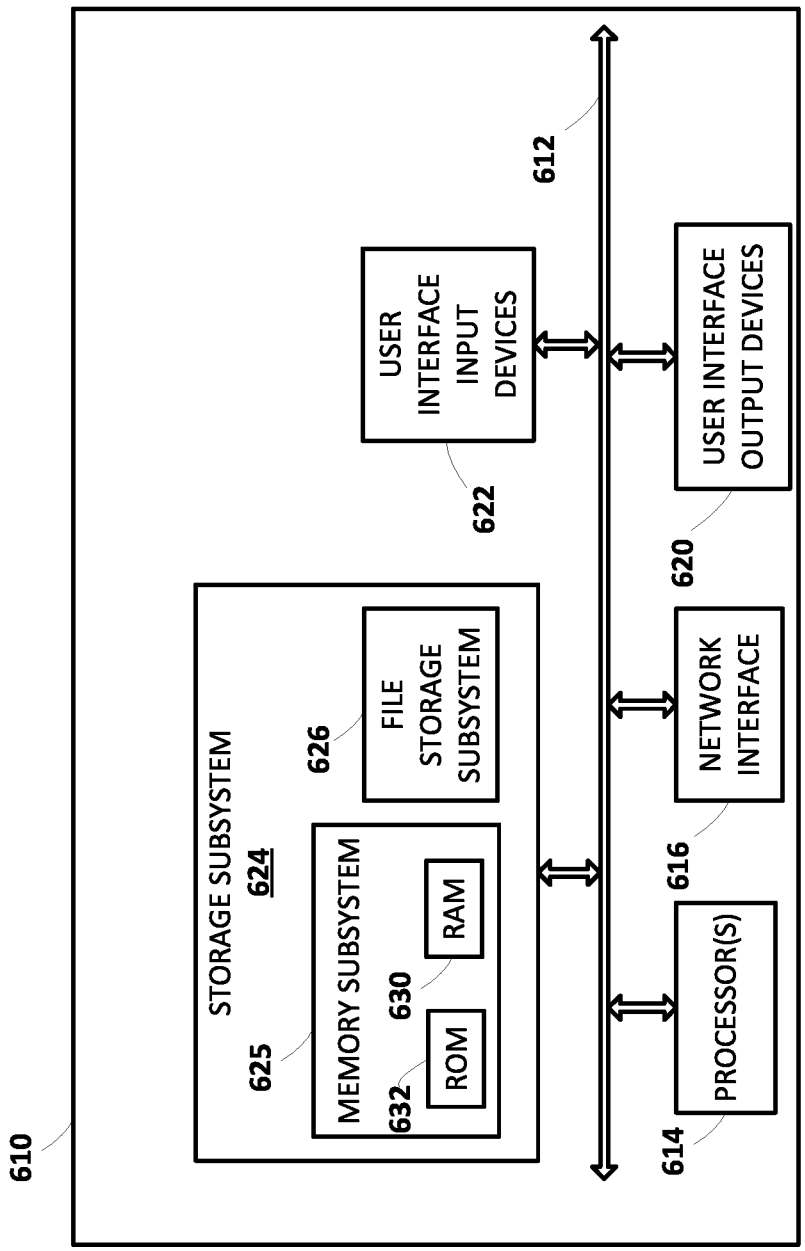
FIG. 6 schematically depicts an example architecture of a computer system.

FIG. 6 is a block diagram of an example computing device 610 that may optionally be utilized to perform one or more aspects of techniques described herein. Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touch screen incorporated into the display, audio input devices such as voice recognition systems, microphones, and/or other types of input devices. In some implementations in which computing device 610 takes the form of a HMD or smart glasses, a pose of a user's eyes may be tracked for use, e.g., alone or in combination with other stimuli (e.g., blinking, pressing a button, etc.), as user input. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, one or more displays forming part of a HMD, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of method 500 described herein, as well as to implement various components depicted in FIGS. 1-4.

These software modules are generally executed by processor 614 alone or in combination with other processors. Memory 625 used in the storage subsystem 624 can include a number of memories including a main random-access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method for using a domain specific language (DSL) to generate training data, the method implemented using one or more processors and comprising:
processing data indicative of one or more ground truth images depicting a real plant using a trained image-to-DSL machine learning (ML) model to generate a first expression in the DSL that describes structure of the real plant, wherein the first expression includes a plurality of parameters;
processing the first expression to programmatically generate a plurality of synthetic DSL expressions, wherein each respective synthetic DSL expression describes structure of a respective synthetic plant for which one or more of the parameters has been altered from the first expression;
processing the plurality of synthetic DSL expressions using a renderer to create a plurality of three-dimensional (3D) synthetic plant models; and
generating one or more two-dimensional (2D) synthetic images that depict the plurality of 3D synthetic plant models in an area.

2. The method of claim 1, further comprising using the one or more 2D synthetic images as training data to train another machine learning model to segment or detect, in digital images, plants of a same type as at least some of the 3D synthetic plant models.

3. The method of claim 1, wherein the DSL comprises an L-system framework.

4. The method of claim 1, wherein the trained image-to-DSL ML model comprises an attention-based transformer.

5. The method of claim 4, wherein processing the one or more images comprises dividing one or more of the images into a plurality of image patches, and iteratively processing the plurality of image patches using the attention-based transformer to generate a respective plurality of output tokens in the DSL.

6. The method of claim 1, further comprising processing the one or more ground truth images using a real-to-sim generator of a generative adversarial network (GAN) to generate one or more synthetic translations of the one or more ground truth images in a synthetic domain, wherein the data indicative of the ground truth images comprises the one or more synthetic translations of the one or more ground truth images in the synthetic domain.

7. The method of claim 1, wherein the trained image-to-DSL ML model is trained using the following operations:
processing a first set of expressions in the DSL using the renderer to create a plurality of initial training 3D synthetic plant models;
generating a plurality of initial training synthetic 2D images that depict the plurality of initial training 3D synthetic plant models;

processing the plurality of initial training synthetic 2D training images using the image-to-DSL ML model to predict a second set of expressions in the DSL;

comparing expressions in the DSL across the first and second sets of expressions; and training the image-to-DSL ML model based on the comparing.

8. The method of claim 7, wherein the image-to-DSL ML model is further trained by programmatically generating the first set of training expressions in the DSL.

9. The method of claim 8, wherein at least some of the plurality of different synthetic training expressions in the DSL are generated stochastically.

10. A system for using a domain specific language (DSL) to generate training data, the system comprising one or more processors and memory storing instructions that, in response to execution by the one or more processors, cause the one or more processors to:

process data indicative of one or more ground truth images depicting a real plant using a trained image-to-DSL machine learning (ML) model to generate a first expression in the DSL that describes structure of the real plant, wherein the first expression includes a plurality of parameters;

process the first expression to programmatically generate a plurality of synthetic DSL expressions, wherein each respective synthetic DSL expression describes structure of a respective synthetic plant for which one or more of the parameters has been altered from the first expression;

process the plurality of synthetic DSL expressions using a renderer to create a plurality of three-dimensional (3D) synthetic plant models; and generate one or more two-dimensional (2D) synthetic images that depict the plurality of 3D synthetic plant models in an area.

11. The system of claim 10, further comprising instructions to use the one or more 2D synthetic images as training data to train another machine learning model to segment or detect, in digital images, plants of a same type as at least some of the 3D synthetic plant models.

12. The system of claim 10, wherein the DSL comprises an L-system framework.

13. The system of claim 10, wherein the trained image-to-DSL ML model comprises an attention-based transformer.

14. The system of claim 13, wherein the instructions to process the one or more images comprise instructions to divide one or more of the images into a plurality of image patches, and iteratively process the plurality of image patches using the attention-based transformer to generate a respective plurality of output tokens in the DSL.

15. The system of claim 10, further comprising instructions to process the one or more ground truth images using a real-to-sim generator of a generative adversarial network (GAN) to generate one or more synthetic translations of the one or more ground truth images in a synthetic domain, wherein the data indicative of the ground truth images comprises the one or more synthetic translations of the one or more ground truth images in the synthetic domain.

16. The system of claim 10, wherein the trained image-to-DSL ML model is trained using the following operations:

processing a first set of expressions in the DSL using the renderer to create a plurality of initial training 3D synthetic plant models;

generating a plurality of initial training synthetic 2D images that depict the plurality of initial training 3D synthetic plant models;

processing the plurality of initial training synthetic 2D training images using the image-to-DSL ML model to predict a second set of expressions in the DSL;

comparing expressions in the DSL across the first and second sets of expressions; and training the image-to-DSL ML model based on the comparing.

17. The system of claim 16, wherein the image-to-DSL model is further train by programmatically generating the first set of training expressions in the DSL.

18. The system of claim 17, wherein at least some of the plurality of different synthetic training expressions in the DSL are generated stochastically.

19. A method for training an image-to-DSL (domain specific language) machine learning (ML) model, the implemented using one or more processors and comprising:

processing a first set of expressions in the DSL using a renderer to create a plurality of initial training 3D synthetic plant models;

generating a plurality of initial training synthetic 2D images that depict the plurality of initial training 3D synthetic plant models;

processing the plurality of initial training synthetic 2D training images using the image-to-DSL ML model to predict a second set of expressions in the DSL;

comparing expressions in the DSL across the first and second sets of expressions; and training the image-to-DSL ML model based on the comparing.

20. The method of claim 19, further comprising programmatically generating the first set of training expressions in the DSL.

* * * * *